Oct. 24, 1939.  J. P. BURKE  2,177,092
COMPOSITE MATERIAL AND METHOD OF PRODUCING SAME
Filed April 12, 1937
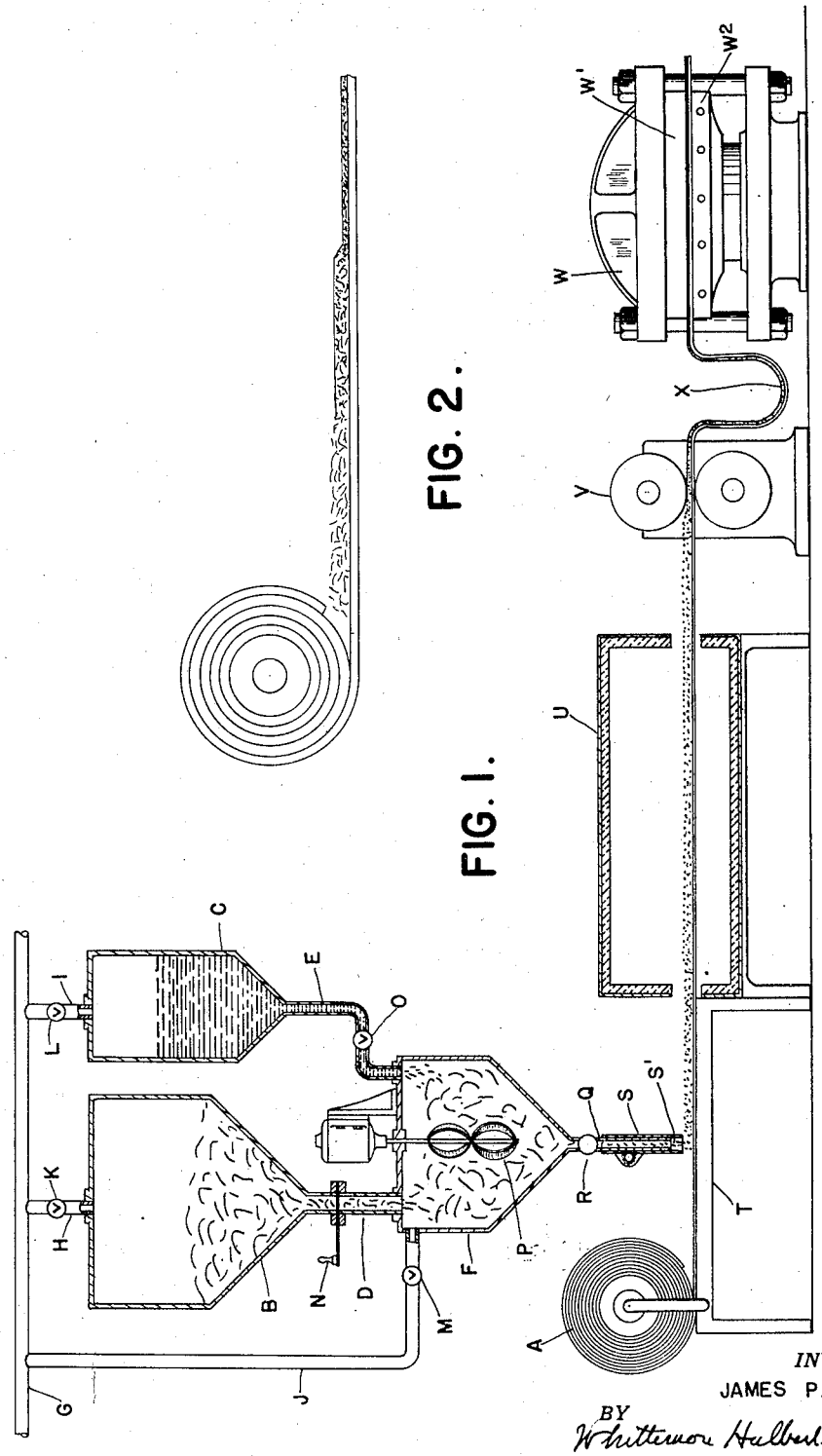
INVENTOR
JAMES P. BURKE
BY
Whittemore Hulbert & Belknap
ATTORNEYS Patented Oct. 24, 1939

2,177,092

UNITED STATES PATENT OFFICE 2,177,092

COMPOSITE MATERIAL AND METHOD OF PRODUCING SAME

James P. Burke, Knoxville, Tenn., assignor, by mesne assignments, to Vermiculite Corporation of America, Detroit, Mich., a corporation of Michigan Application April 12, 1937, Serial No. 136,457

3 Claims. (Cl. 91—68)

The invention relates to composite materials of that type including vermiculite or equivalent siliceous material and a binder. It is one of the objects of the invention to apply a composition of this type to a fabric base to form thereof a material suitable for use as a floor covering and other analogous uses. It is a further object to form a material of this character employing a varnish binder for the vermiculite, and still further it is an object to simplify and expedite the process of manufacture. With these objects in view, the invention consists in the composite material and method of forming the same as hereinafter set forth.

In the drawing:

Figure 1 is a vertical longitudinal section of an apparatus suitable for producing my improved composite material;

Figure 2 is an enlarged view illustrating the successive steps in the manufacture of the same.

The principal ingredient of my improved composite material is exfoliated vermiculite which is formed by subjecting natural vermiculite to a heat treatment. This disintegrates the natural material forming thereof relatively small flakes which are so twisted or curled as to form air pockets therebetween and to greatly increase the bulk. The separate particles are integrated by a suitable binder of the nature of varnish or a resinous material. It is, however, desirable to limit the quantity of the binder so as to leave the voids between particles unfilled and in more or less communication with the external atmosphere. As a consequence, the varnish films will quickly dry particularly if subjected to heat.

The material as thus far described, forms the subject matter of a co-pending application Serial No. 136,456, filed April 12, 1937, for patent and is useful for various purposes, such as thermal and sound insulation. If, however, it is desired to use the material as a floor covering or for other purposes where it is subjected to wear, it is necessary that it should be densified which may be accomplished by subjecting the same to pressure. Also, the material must be applied to some suitable fabric which will impart thereto the necessary tensile strength.

Figure 1 shows an apparatus suitable for manufacturing this material in which A is a roll of burlap or other suitable fabric for forming the base of the material. B and C are containers respectively for the exfoliated vermiculite and the binder and which are connected through conduits D and E with a mixing chamber F. Air under pressure is introduced into the upper end of each of these containers through a conduit G and branch conduits H, I and J. Valves K, L, and M in the conduits H, I and J may be adjusted to regulate the pressures in the separate compartments, and valves or dampers N and O in the conduits D and E regulate the feed of the vermiculite and binder into the container F. Within the container F is a mechanical agitator P which is of such a nature as to not only stir and commingle the vermiculite and binder, but also to introduce into the mixture a quantity of air. As a result the material discharged from the lower end of the container F has a relatively high percentage of voids or air passages, there being only sufficient binder to cement the vermiculite particles to each other without filling these voids. The discharge conduit Q from the chamber F has a regulating valve R and also a telescopic nozzle S which may be raised or lowered and has a discharge slot S' extending transversely across the fabric fed from the roll A. This fabric is supported on a shelf or table T and by adjusting the nozzle S in relation thereto the depth of material deposited on the fabric may be regulated. From the table T the fabric passes through an oven U heated by any suitable means, preferably to a temperature from 180° F. to 375° F. It then passes out of the oven to feed rolls V which not only form the advancing means but also crush down the porous mass to a certain extent. The material is further compressed and densified in a press W, the platens W' and W² of which are heated to a temperature from 180° F. to 375° F. The operation of this press is intermittent while the feeding of the fabric past the nozzle S and through the oven U and rolls V is constant. Therefore, the material upon leaving the rolls V falls in a loop X while the advanced portion is in the press and this will supply sufficient material for a succeeding pressing operation.

The process of manufacture as above described has the important advantage that the porous material first deposited upon the fabric may be quickly cured or dried by reason of communication between the interior air cells and the external atmosphere. On the other hand, if the material were first applied to the fabric in densified form it would require a long period of time to harden the varnish binder. Densifying after the drying of the binder is easily performed, particularly where the platens of the press are heated to a temperature at which the binder becomes adhesive. Sticking of the material to the rolls and platens of the press is prevented by coating the same with beeswax or other suitable lubricant.

What I claim as my invention is:

1. As an article of manufacture, a fabric base and a layer of a substantially densified composition of exfoliated vermiculite, and a varnish binder applied to said base having an exposed surface.

2. As an article of manufacture, a burlap strip and a substantially densified composition of exfoliated vermuculite, and a varnish binder impregnating said burlap strip forming an outer coating therefor having an exposed surface.

3. A method of forming floor coverings comprising, commingling exfoliated vermiculite and a limited quantity of varnish binder, introducing air into the mixture forming thereof a porous mass, depositing the mixture in the form of a sheet on a fabric base permitting the varnish binder to dry and then applying sufficient pressure to form a densified layer of the mixture on said fabric base.

JAMES P. BURKE.